US005401304A

United States Patent [19]
Wykes et al.

[11] Patent Number: 5,401,304
[45] Date of Patent: Mar. 28, 1995

[54] METHOD FOR THE MANUFACTURE OF SOLVENT-SPUN CELLULOSE FIBRE INVOLVING TRANSPORT OF CELLULOSE SOLUTION THROUGH PIPES

[75] Inventors: Katharine A. Wykes, Wellesbourne; Michael C. Quigley, Meriden, both of United Kingdom

[73] Assignee: Courtaulds Fibres (Holdings) Limited, London, England

[21] Appl. No.: 247,395

[22] Filed: May 23, 1994

Related U.S. Application Data

[63] Continuation of Ser. No. 69,184, May 28, 1993, Pat. No. 5,354,371.

[51] Int. Cl.$^6$ .................. C09D 101/02; C08L 1/02
[52] U.S. Cl. ................................ 106/203; 264/555
[58] Field of Search ................ 106/198, 203; 264/555

[56] References Cited

U.S. PATENT DOCUMENTS 4,416,698 11/1983 McCorsley, III .................. 106/186
4,426,228 1/1984 Brandner et al. .................. 106/203

Primary Examiner—David Brunsman
Attorney, Agent, or Firm—Davis Hoxie Faithfull & Hapgood

[57] ABSTRACT

In a process for making solvent-spun cellulose fibre, cellulose is dissolved in aqueous N-methylmorpholine N-oxide to form a solution, said solution is passed through at least one pipe, the temperature in degrees Centigrade of said solution in the center of said pipe being controlled at $1000/(X+0.98\sqrt{D})$ and/or the temperature of said solution at the interior wall of said pipe being controlled at $1000/(Y+1.15\sqrt{D})$ where D represents the internal diameter of said pipe in inches, X represents a value equal to or greater than 5.0 and Y represents a value equal to or greater than 5.4, and said solution is subsequently extruded through a die to form filaments which are coagulated, washed with water to remove said solvent and then dried, thereby forming said solvent-spun cellulose fibre.

46 Claims, 1 Drawing Sheet

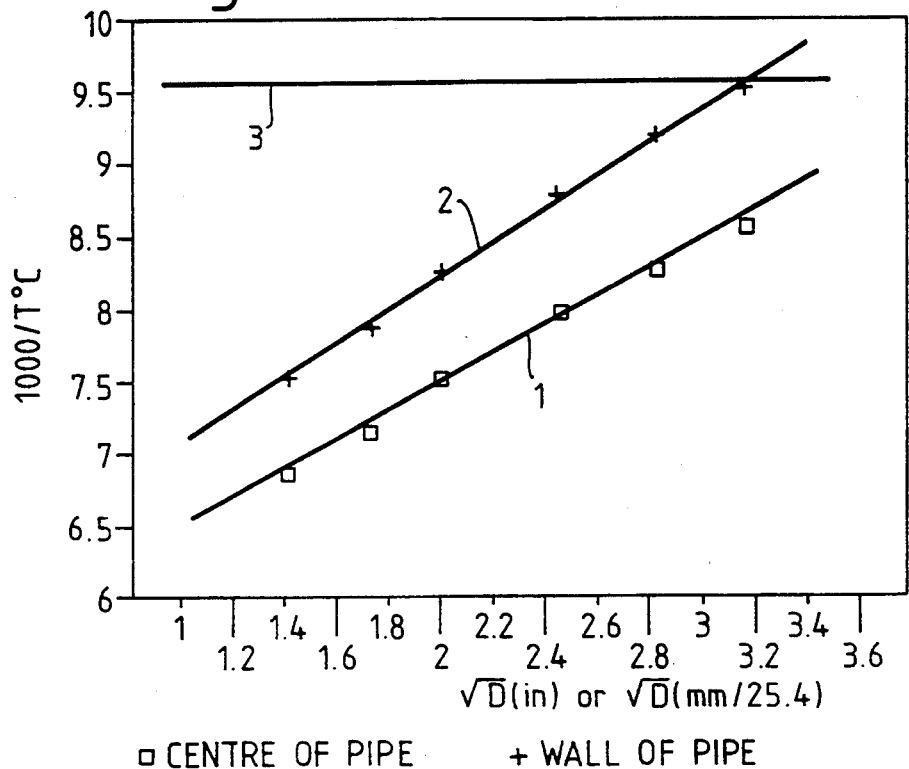
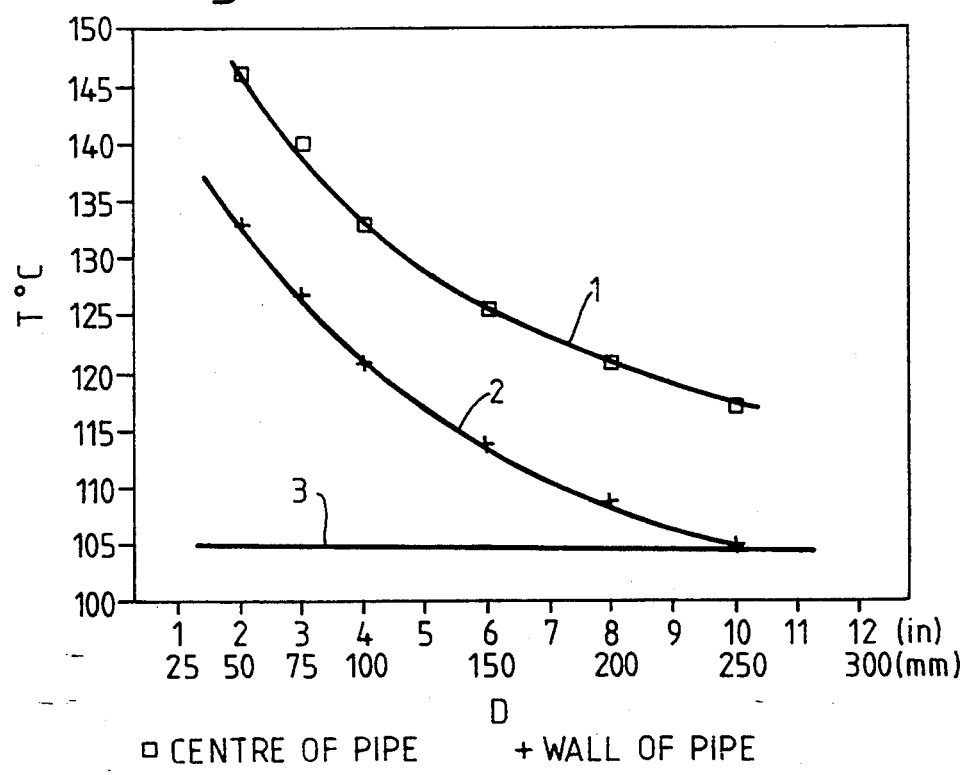

METHOD FOR THE MANUFACTURE OF SOLVENT-SPUN CELLULOSE FIBRE INVOLVING TRANSPORT OF CELLULOSE SOLUTION THROUGH PIPES

This is a continuation of application Ser. No. 08/069,184, filed on May 28, 1993, now U.S. Pat. No. 5,354,371.

This invention relates to the transport of solutions of cellulose in a tertiary amine q-oxide, in particular N-methylmorpholine N-oxide, through pipes.

It is known that cellulose fibre can be made by extrusion of a solution of cellulose in a suitable solvent into a coagulating bath. One example of such a process is described in U.S. Pat. No. 4,416 698 (McCorsley III), the contents of which are incorporated herein by way of reference. Cellulose is dissolved in a solvent containing a tertiary amine N-oxide (which may also be called for brevity an amine oxide), for example N-methylmorpholine N-oxide (NMMO). The solvent may also contain a proportion of a non-solvent for cellulose, for example water. The resulting solution is extruded through a suitable die to produce filaments, which are coagulated, washed in water to remove the solvent, and dried. This process of extrusion and coagulation is referred to as "solvent-spinning", and the cellulose fibre produced thereby is referred to as "solvent-spun" cellulose fibre. It is also known that cellulose fibre can be made by extrusion of a solution of a cellulose derivative into a generating and coagulating bath. One example of such a process is the viscose process, in which the cellulose derivative is cellulose xanthate. Solvent-spinning has a number of advantages over other known processes for the manufacture of cellulose fibre such as the viscose process, for example reduced environmental emissions.

U.S. Pat. No. 4,416,698 describes a method of preparing a solution of cellulose in a tertiary amine N-oxide and a method for preparing a shaped article such as a fibre from such a solution. A mixture of the tertiary amine N-oxide containing the preferred amount of water and the cellulose are ground to the same predetermined particle size and charged simultaneously to the barrel of an extruder. The preferred temperature range in the barrel of the extruder for processing the mixture of cellulose and solvent thereby dissolving the cellulose is from about 90° C. to about 140° C. Degradation of the cellulose can be avoided or substantially reduced by dissolving the cellulose in the barrel of the extrusion apparatus, extruding the solution to form a film or filament and promptly precipitating the cellulose before degradation of the cellulose.

U.S. Pat. No. 4,426,228 (Brandner et al), the contents of which are incorporated herein by way of reference, describes a solution of cellulose in a solvent which is a tertiary amine N-oxide optionally mixed with a non-solvent for the cellulose and a method of preparing the same. The solution may contain up to 25% by weight of the non-solvent, for example water. The solution additionally comprises an additive which limits polymer decomposition at elevated temperatures so that the solution is only slightly coloured and cellulose articles made there from exhibit improved properties such as strength. One example of such an additive is propyl gallate used at 0.01 to 5% by weight relative to the solvent. U.S. Pat. No. 4,426,228 also describes a method of preparing such a solution in which the cellulose and the solvent are processed at temperatures between 70° C. and 190° C. until the cellulose has been dissolved. A solution containing 5 to 8% by weight cellulose is particularly appropriately prepared by processing at temperatures between 70° C. and 100° C. In order to hold the processing time as low as possible and to attain high production rates, temperatures between 100° C. and 150° C. or between 115° C. and 130° C. may be used.

It is known that the solutions of cellulose in a tertiary amine N-oxide exhibit high viscosity, particularly those solutions which contain more than about 10% by weight, for example 10 to 25% by weight, cellulose. Solutions containing such relatively high concentrations of cellulose are desirably used in the commercial manufacture of fibre and film both to reduce processing costs and in particular because extrusion of such solutions leads to the production of fibre and film with improved physical properties, for example tensile strength. It is also known that the viscosity of such solutions deceases as their temperature is raised. It is therefore desirable to transport such solutions at high temperature in order to reduce the pumping costs associated with transporting high viscosity solutions.

It is also known that solutions of cellulose in a tertiary amine N-oxide such as NMMO are liable to degradation when stored at elevated temperatures. Such solutions may become discoloured when stored at temperatures above about 130° C. It is also known that uncontrolled exothermic reaction may occur when such solutions are stored at temperatures above about 170° C. It has further been observed that such uncontrolled exothermic reaction may occur even when such solutions are stored for extended periods of time at temperatures considerably 170° C. This fact has hampered the commercial development and utilisation of solvent-spinning processes, because the risk of uncontrolled exothermic reaction is not acceptable industrial-scale plant. The risk has previously been minimised on the laboratory or pilot plant scale by extruding the solution immediately after its preparation, so minimising the time during which the solution is stored. However, this solution is less than satisfactory for industrial-scale production, both because it is desirable to submit the solution to intermediate processing operations such as filtration between preparation and extrusion, and because it is not possible to assemble the elements of industrial-scale plant in as close a spatial relationship as the elements of laboratory or pilot plant apparatus.

The invention provides in a first aspect a method for transporting a solution of cellulose in aqueous N-methylmorpholine N-oxide through a pipe, the temperature in degrees Centigrade of the solution in the centre of the pipe being controlled at no more than $$1000/(X + 0.98 \times \sqrt{D}),$$

where D represents the internal diameter of the pipe in inches and X represents a numerical value. The value of X may be 5.0, in preferred embodiments of the invention the value of X is 5.25 or 5.75, and in a particularly preferred embodiment the value of X is 5.5.

The invention further provides in a second aspect a method for transporting a solution of cellulose in aqueous N-methylmorpholine N-oxide through a pipe, the temperature in degrees Centigrade of the solution at the interior wall of the pipe being controlled at no more than $$1000/(Y + 1.15 \times \sqrt{D}),$$

where D represents the internal diameter of the pipe in inches and Y represents a numerical value. The value of Y may be 5.4, in preferred embodiments of the invention the value of Y is 5.65 or 6.15, and in a particularly preferred embodiment the value of Y is 5.9.

The solution of cellulose in N-methylmorpholine N-oxide may be referred to hereinafter alternatively as the "dope".

The dope may for example comprise by weight 10 to 25%, preferably 13 to 17%, cellulose and 7 to 13% water, with the balance being largely NMMO. The dope preferably contains an additive which limits polymer decomposition at elevated temperatures, as described for example in U.S. Pat. No. 4,426,228, for example propyl gallate. The dope preferably contains 0.01 to 0.5%, more preferably 0.05 to 0.2%, by weight propyl gallate. It has been found that the presence of such an additive increases the temperature at which the dope may be stored and transported without undergoing exothermic decomposition by several degrees Centigrade, for example by 5° to 10° C.

Use of the value 5.5 for X or of the value 5.9 for the value Y is believed to give a safety margin of at least about 10° C. between the temperature of the dope in the centre of the pipe and the temperature at which spontaneous exothermic decomposition may occur during operation when the dope contains an additive as hereinbefore described.

The pipe is generally at least 0.5 or 1 inch in external diameter, preferably at least 2, 3 or 4 inches in external diameter. The pipe may be up to 12 inches in external diameter, but is generally no more than 10 or 8 inches in external diameter. Pipes of 6 inches external diameter may also be used. Pipes of 4 to 8 inches external diameter may be preferred. It will be noted that the equations defined in the methods of the invention relate the temperature of the dope to the internal diameter of the pipe, whereas the preceding numbers refer to the nominal external diameter of the pipe. Pipework is generally specified and sold commercially by reference to its nominal external diameter.

The flow rate of the dope through the pipe may be for example in the range 0.1 to 10 m/min, preferably 1 to 5 m/min.

The methods of the invention have been found to be generally less satisfactory for vessels of large diameter than for pipes of about 12 inches diameter or below, for example filters and tanks having internal diameters in the range about 20 to about 40 inches. Such filters and tanks may in general be operated at a temperatures several degrees above those according to the method of the invention, at least during continuous operation.

The temperature of the dope in the pipe both at the wall of the pipe and in the centre of the pipe may be controlled by equipping the pipe with a thermostatic jacket, for example a hollow jacket containing a circulating heat transfer fluid such as water. The temperature of the thermostatic jacket is generally maintained below the temperature of the dope at the centre of the pipe to provide some external cooling and thereby remove any heat generated by any exothermic reaction which may take place in the dope. The temperature of the thermostatic jacket is essentially the same as that of the dope at the wall of the pipe. It has been found that slow exothermic reaction may take place in dope stored at temperatures considerably below 170° C., the temperature in which spontaneous decomposition is known to occur.

Use of such external cooling means is therefore preferred. It will be understood from the above that the value of Y is generally higher than the value of X. In particular it may be preferred that the value of (Y−X) is about 0.4. The temperature of the dope in the centre of the pipe is generally about 10° to about 15° C., preferably about 11° to about 14° C., higher than the temperature of the dope at the wall of the pipe, although it will be understood that this preferred temperature difference is to some extent dependent on the internal diameter of the pipe. The temperature of the dope may be controlled by suitably Varying the flow rate or the temperature of the heat transfer fluid acting as cooling medium.

The minimum temperature of the dope in the centre of the pipe is preferably at least 100° C., more preferably at least 105° C. It has been found that the viscosity of the dope is sufficiently low for the dope to be pumped through pipes in a commercial scale factory when it has at least such a minimum temperature. A dope containing about 15% by weight cellulose may exhibit a viscosity of about 2000 Pa.s (20,000 poise) at a shear rate of 1 sec$^{-1}$ at 100° C., 1500 Pa.s (15,000 poise) at 110° C. and 1000 Pa.s (10,000 poise) at 120° C. The first aspect of the invention provides for a dope temperature in the sensor of the pipe which may be 105° C. or higher for all pipe sizes up to at least about 12 inches internal diameter. The preferred temperature of the dope in the centre of the pipe is between the minimum and maximum temperatures hereinbefore mentioned.

Processing of cellulose and solvent to dissolve the cellulose may provide dope at a higher temperature than that required by the methods of the invention, and in such a case the hot dope may be cooled to the desired temperature shortly after dissolution by passage through a suitable heat exchanger. It may be desired to extrude the dope to form fibre or film at a higher temperature than that required by the methods of the invention, for example to obtain optimum tensile properties, and in such a case the dope can be warmed to the desired temperature shortly before extrusion by passage through a suitable heat exchanger. One example of a suitable type of heat exchanger is a shell-and-tube heat exchanger in which the dope passes through the tubes, the tubes being equipped with static mixers which serve to mix the dope and so improve the efficiency of the heat exchange, and the heat transfer medium passes through the shell, as available for example from Kenics Corporation. Another example of a suitable type of heat exchanger consists of a chamber containing a sinuous tube, the heat transfer medium passing through the sinuous tube, and the dope passing through the chamber over the tube, as available for example from Gebrueder Sulzer Ag under the Trade Mark "Sulzer SMR".

Use of the methods of the invention permits solvent-spinning of cellulose to be carried out safely on the industrial scale. The methods of the invention have the advantage that additional process items, for example filters, mixers and buffer tanks, can be interposed between the dissolution apparatus and the extrusion apparatus.

They have the further advantage that pipes containing dope do not need to be emptied if dope transport is stopped for any reason, for example to allow plant maintenance such as filter changes. The dope in the pipe is advantageously cooled to lower temperature, for example around 80° C., during such a stoppage by circulation of cool heat transfer fluid through the thermostatic jacket. The dope so cooled can be warmed to the required temperature for transport after the stoppage by increasing the temperature of the heat transfer fluid. Nevertheless, such additional process items are preferably emptied during such a stoppage and refilled afterwards.

Practical experience and experiment bears out the value of the methods of the invention, in particular in reducing the occurrence of uncontrolled exothermic reaction to an acceptably very low value. This is especially remarkable in that the equations upon which they rely they have no apparent theoretical basis. In particular, it is surprising that they should involve the square root of a linear dimension, namely the internal diameter of the pipe, rather than either the dimension itself or its square or cube, which are proportional to surface area and volume respectively.

BRIEF DESCRIPTION OF THE DRAWINGS

The invention will now be more particularly explained with reference to the accompanying Figures, in which:

FIG. 1 is a graph of $1000/T$ against $\sqrt{D}$, where T is dope temperature in °C. and D is internal pipe diameter in inches.

FIG. 2 is a graph of T against D, where T and D have the same meanings as in FIG. 1.

Referring to FIG. 1, line 1 corresponds to the equation $$1000/T = 5.5 + 0.98 \times \sqrt{D}$$

representing the relationship between a preferred maximum temperature of the dope in the centre of the pipe and the internal diameter of the pipe. Line 2 corresponds to the equation $$1000/T = 5.9 + 1.15 \times \sqrt{D}$$

representing the relationship between a preferred maximum temperature of the dope at the wall of the pipe and the internal diameter of the pipe. Line 3 corresponds to 105° C., which is a preferred minimum temperature for the dope in the centre of the pipe. The data points represented by squares correspond to dope temperature in the centre of the pipe and the data points represented by crosses to dope temperature at the wall of the pipe as recorded in Table 1 below:

TABLE 1

| D inches | Centre °C. | Wall °C. |
|---|---|---|
| 2 | 146 | 133 |
| 3 | 140 | 127 |
| 4 | 133 | 121 |
| 6 | 125.5 | 114 |
| 8 | 121 | 109 |
| 10 | 117 | 105 |

The data points in Table 1 have been determined empirically to provide a safety margin of at least 10° C. between the dope temperature in the centre of the pipe and the temperature at which spontaneous exothermic reaction may take place when the dope contains about 0.05 to about 0.2% by weight propyl gallate. It will be observed that the agreement between the relevant equations and the data points is excellent.

Referring to FIG. 2, line 1 relates dope temperature in the centre of the pipe to internal pipe diameter when X=5.5, line 2 relates dope temperature at the wall of the pipe to internal pipe diameter when Y=5.9, and line 3 corresponds to 105° C. The data points of Table 1 are represented by squares and crosses as in FIG. 1.

We claim:
1. A method for the manufacture of solvent-spun cellulose fibre including the steps of:
   (a) forming a solution of cellulose in an aqueous N-methylmorpholine N-oxide solvent;
   (b) passing said solution through at least one pipe, the temperature in degrees Centigrade of said solution in the center of each said pipe being controlled at

$$1000/(X + 0.98 \times \sqrt{D}),$$

where D represents the internal diameter of said pipe in inches and X represents a value equal to or greater than 5.0; and
   (c) extruding said solution through a die to form filaments which are coagulated, washed in water to remove said solvent and dried, thereby forming said solvent-spun cellulose fibre.
2. A method according to claim 1, wherein X represents a value equal to or greater than 5.25.
3. A method according to claim 1, wherein X represents a value equal or greater than 5.5.
4. A method according to claim 3, wherein said solution comprises an additive which limits decomposition at elevated temperatures.
5. A method according to claim 4, wherein said additive is propyl gallate at a concentration of 0.05 to 0.2 percent by weight.
6. A method according to claim 1, wherein said solution comprises 10 to 25 percent by weight cellulose and 7 to 13 percent by weight water.
7. A method according to claim 1, wherein said solution comprises an additive which limits decomposition at elevated temperatures.
8. A method according to claim 7, wherein said additive is propyl gallate at a concentration of 0.05 to 0.2 percent by weight.
9. A method according to claim 1, wherein the nominal external diameter of said pipe is at least 2 inches.
10. A method according to claim 1, wherein the nominal external diameter of said pipe is no more than 12 inches.
11. A method according to claim 1, wherein the nominal external diameter of said pipe is in the range 4 to 8 inches.
12. A method according to claim 1, wherein the temperature of said solution is at least 100° C.
13. A method according to claim 1, wherein the temperature of said solution is at least 105° C.
14. A method according to claim 1, wherein the flow rate of said solution through said pipe is in the range 0.1 to 10 m/min.
15. A method according to claim 1, wherein the flow rate of said solution through said pipe is in the range 1 to 5 m/min.
16. A method for the manufacture of solvent-spun cellulose fibre including the steps of:
   (a) forming a solution of cellulose in an aqueous N-methylmorpholine N-oxide solvent;
   (b) passing said solution through at least one pipe, the temperature in degrees Centigrade of said solution at the interior wall of each said pipe being controlled at $$1000/(Y + 1.15 \times \sqrt{D}),$$

where D represents the internal diameter of said pipe in inches and Y represents a value equal to or greater than 5.4; and (c) extruding said solution through a die to form filaments which are coagulated, washed in water to remove said solvent and dried, thereby forming said solvent-spun cellulose fibre.

17. A method according to claim 16, wherein Y represents a value equal to or greater than 5.65.

18. A method according to claim 16, wherein Y represents a value equal to or greater than 5.9.

19. A method according to claim 18, wherein said solution comprises an additive which limits decomposition at elevated temperatures.

20. A method according to claim 17, wherein said additive is propyl gallate at a concentration of 0.05 to 0.2 percent by weight.

21. A method according to claim 16, wherein said solution comprises 10 to 25 percent by weight cellulose and 7 to 13 percent by weight water.

22. A method according to claim 16, wherein said solution comprises an additive which limits decomposition at elevated temperatures.

23. A method according to claim 22, wherein said additive is propyl gallate at a concentration of 0.05 to 0.2 percent by weight.

24. A method according to claim 16, wherein the nominal external diameter of said pipe is at least 2 inches.

25. A method according to claim 16, wherein the nominal external diameter of said pipe is no more than 12 inches.

26. A method according to claim 16, wherein the nominal external diameter of said pipe is in the range 4 to 8 inches.

27. A method according to claim 16, wherein the flow rate of said solution of cellulose through said pipe is in the range 0.1 to 10 m/min.

28. A method according to claim 16, wherein the flow rate of said solution of cellulose through said pipe is in the range 1 to 5 m/min.

29. A method for the manufacture of solvent-spun cellulose fibre including the steps of:

(a) forming a solution of cellulose in an aqueous N-methylmorpholine N-oxide solvent;

(b) passing said solution through at least one pipe, the temperature in degrees Centigrade of said solution in the centre of each said pipe being controlled at $$1000/(X+0.98\times\sqrt{D}),$$

and the temperature in degrees Centigrade of said solution at the interior wall of each said pipe being controlled at $$1000/(X+1.15\times\sqrt{D}),$$

where D represents the internal diameter of said pipe in inches, X represents a value equal to or greater than 5.0, and Y represents a value equal to or greater than 5.4; and (c) extruding said solution through a die to form filaments which are coagulated, washed in water to remove said solvent and dried, thereby forming said solvent-spun cellulose fibre.

30. A method according to claim 29, wherein X represents a value equal to or greater than 5.25 and Y represents a value equal to or greater than 5.65.

31. A method according to claim 29, wherein X represents a value equal to or greater than 5.5 and Y represents a value equal to or greater than 5.9.

32. A method according to claim 31, wherein said solution comprises an additive which limits decomposition at elevated temperatures.

33. A method according to claim 32, wherein said additive is propyl gallate at a concentration of 0.05 to 0.2 percent by weight.

34. A method according to claim 29, wherein said solution comprises 10 to 25 percent by weight cellulose and 7 to 13 percent by weight water.

35. A method according to claim 29, wherein said solution comprises an additive which limits decomposition at elevated temperatures.

36. A method according to claim 35, wherein said additive is propyl gallate at a concentration of 0.05 to 0.2 percent by weight.

37. A method according to claim 29, wherein the nominal external diameter of said pipe is at least 2 inches.

38. A method according to claim 29, wherein the nominal external diameter of said pipe is more than 12 inches.

39. A method according to claim 29, wherein the nominal external diameter of said pipe is the range 4 to 8 inches.

40. A method according to claim 29, wherein the temperature of said solution in said center of said pipe is at least 100° C.

41. A method according to claim 29, wherein the temperature of said solution in said center of said pipe is at least 105° C.

42. A method according to claim 29, wherein the temperature of said solution in said center of said pipe is 10° to 15° C. higher than the temperature of said solution at said interior wall of said pipe.

43. A method according to claim 29, wherein said pipe is equipped with a thermostatic jacket.

44. A method according to claim 43, wherein said thermostatic jacket is a hollow jacket through which water is circulated.

45. A method according to claim 29, wherein the flow rate of said solution of cellulose through said pipe is in the range 0.1 to 10 m/min.

46. A method according to claim 29, wherein the flow rate of said solution of cellulose through said pipe is in the range 1 to 10 m/min.

* * * * *

UNITED STATES PATENT AND TRADEMARK OFFICE
CERTIFICATE OF CORRECTION

PATENT NO. : 5,401,304
DATED : March 28, 1995
INVENTOR(S) : Katharine A. Wykes et al

It is certified that error appears in the above-indentified patent and that said Letters Patent is hereby corrected as shown below:

| | | |
|---|---|---|
| Col. 1, | line 11, | cancel "q-oxide" and substitute --N-oxide--. |
| Col. 1, | line 31, | cancel "generating" and substitute --regenerating--. |
| Col. 5, | line 39, | delete "10". |
| Col. 7, | line 16, | (Claim 20) cancel "claim 17" and substitute --claim 19--. |
| Col. 7, | line 57, | (Claim 29) in the equation, cancel "X" and substitute --Y--. |

Signed and Sealed this

Twenty-fifth Day of July, 1995

Attest:

BRUCE LEHMAN

*Attesting Officer*     *Commissioner of Patents and Trademarks*